(12) United States Patent
Markowski

(10) Patent No.: US 8,400,125 B2
(45) Date of Patent: Mar. 19, 2013

(54) MULTIPHASE POWER CONVERTERS, CONTROLLERS AND CONTROL METHODS

(75) Inventor: Piotr Markowski, Ansonia, CT (US)

(73) Assignee: Astec International Limited, Kwun Tong, Kowloon (HK)

( * ) Notice: Subject to any disclaimer, the term of this patent is extended or adjusted under 35 U.S.C. 154(b) by 549 days.

(21) Appl. No.: 12/566,892

(22) Filed: Sep. 25, 2009

(65) Prior Publication Data

US 2011/0074378 A1      Mar. 31, 2011

(51) Int. Cl.
    *G05F 1/00*       (2006.01)
    *H02J 1/10*       (2006.01)

(52) U.S. Cl. .......................................... 323/282; 363/65

(58) Field of Classification Search .................. 323/271, 323/272, 282, 283, 285, 351; 363/65
    See application file for complete search history.

(56) References Cited

U.S. PATENT DOCUMENTS

| | | | |
|---|---|---|---|
| 6,215,290 B1 * | 4/2001 | Yang et al. | 323/282 |
| 6,727,605 B1 | 4/2004 | Maple | |
| 6,819,577 B1 | 11/2004 | Wiktor et al. | |
| 6,967,854 B2 | 11/2005 | Lai et al. | |
| 6,979,980 B1 | 12/2005 | Hesterman et al. | |
| 7,161,337 B2 * | 1/2007 | Nishimori | 323/271 |
| 7,560,914 B2 | 7/2009 | O'Driscoll et al. | |
| 7,679,338 B2 * | 3/2010 | Goh et al. | 323/222 |
| 7,701,190 B2 * | 4/2010 | Chen et al. | 323/288 |
| 7,706,151 B2 | 4/2010 | Neidorff et al. | |
| 2007/0013350 A1 * | 1/2007 | Tang et al. | 323/237 |
| 2009/0058379 A1 * | 3/2009 | Sreenivas | 323/241 |
| 2009/0224731 A1 * | 9/2009 | Tang et al. | 323/241 |

FOREIGN PATENT DOCUMENTS

JP            57040361 A        3/1982

OTHER PUBLICATIONS

"Digital Phase-Shifting for Multiphase Converters," A. deCastro, P. Zumel, O. Garcia and T. Riesgo; DCIS 2004; pp. 332-337.

* cited by examiner

*Primary Examiner* — Adolf Berhane
*Assistant Examiner* — Emily Pham
(74) *Attorney, Agent, or Firm* — Harness, Dickey & Pierce, P.L.C.

(57) ABSTRACT

A method of controlling a multiphase power converter including a plurality of sub-converters coupled to provide power to a load is disclosed. Each sub-converter includes a power switch. The method includes selectively and consistently turning on the power switch of one or more of the sub-converters at substantially a same time as a reference signal representing a desired output of the power converter increases. The method further includes selectively and consistently turning off the power switch of one or more of the sub-converters at substantially a same time as the reference signal representing the desired output of the power converter decreases. Other methods, multiphase power converters and controllers for multiphase power converters are also disclosed.

23 Claims, 6 Drawing Sheets

MULTIPHASE POWER CONVERTERS, CONTROLLERS AND CONTROL METHODS

FIELD

The present disclosure relates to multiphase power converters, controllers for multiphase power converters and methods of controlling multiphase power converters.

BACKGROUND

This section provides background information related to the present disclosure which is not necessarily prior art.

Multiphase power converters include more than one power converter. The power converters of known multiphase power converters are typically operated in a discrete number of phases. Pulse width modulated (PWM) signals are typically generated for the phases by comparing a reference voltage to one or more fixed frequency and fixed magnitude saw-tooth waveforms. The timing of the turn on and/or turn off of the phases is generally dictated by the saw-tooth waveform.

SUMMARY

This section provides a general summary of the disclosure, and is not a comprehensive disclosure of its full scope or all of its features.

According to one aspect of this disclosure, a method of controlling a multiphase power converter including a plurality of sub-converters coupled to provide power to a load is disclosed. Each sub-converter includes a power switch. The method includes selectively and consistently turning on the power switch of one or more of the sub-converters at substantially a same time as a reference signal representing a desired output of the power converter increases and selectively and consistently turning off the power switch of one or more of the sub-converters at substantially a same time as the reference signal representing the desired output of the power converter decreases.

According to another aspect of the present disclosure, a method of controlling a multiphase power converter including a plurality of sub-converters coupled to provide power to a load is disclosed. Each sub-converter includes a power switch. The method includes comparing a reference signal representing a desired output voltage of the power converter to a count of a counter associated with one of the plurality of sub-converters to determine whether to generate a control signal for a switch of said sub-converter. The method also includes incrementing the count when the reference signal changes in a first direction.

According to yet another aspect of this disclosure, a method of controlling a multiphase power converter including a plurality of sub-converters and a control circuit including a plurality of counters is disclosed. Each counter has a controllable count state different from the other counters and each counter is associated with a different one of the plurality of sub-converters. Each count state includes a count represented by an integer. The method includes generating a reference signal representing a desired output of the power converter. The method also includes determining if a relationship between the reference signal and a prior value of the reference signal satisfies a first condition and similarly changing the count state of each of the counters if the first condition is satisfied. The method further includes comparing the reference signal to a current state of each of the counters to determine for each counter whether a second condition is met and, for the sub-converters associated with the counters for which the second condition is met, generating a power switch control signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
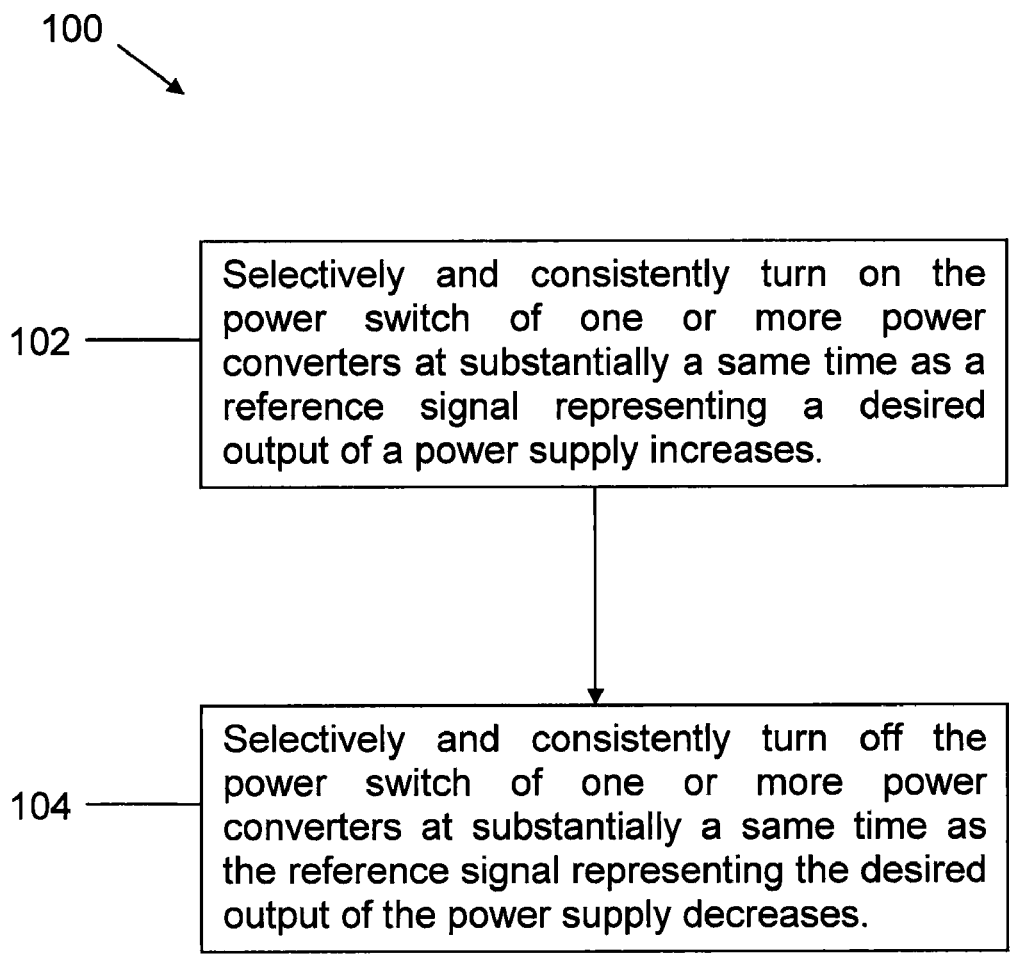
FIG. 1 is a flow diagram of a method of controlling a multiphase power converter according to at least one aspect of this disclosure.
Figure 2:
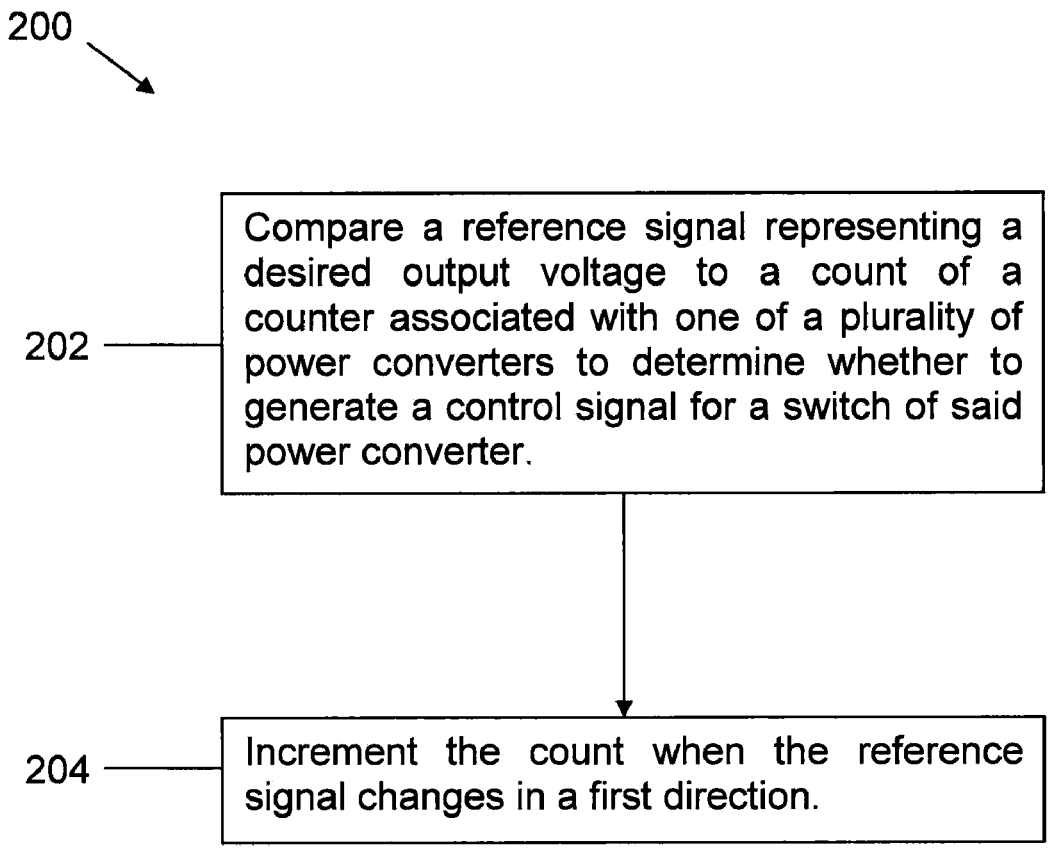
FIG. 2 is a flow diagram of another method of controlling a multiphase power converter according to at least one aspect of this disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

According to one aspect of the present disclosure, a method, generally indicated by the reference number 100, of controlling a multiphase power converter including a plurality of sub-converters coupled to provide power to a load is disclosed. Each sub-converter includes a power switch. The method 100 includes, at 102, selectively and consistently turning on the power switch of one or more of the sub-converters at substantially a same time as a reference signal representing a desired output of the power converter increases. At 104, the method 100 includes selectively and consistently turning off the power switch of one or more of the sub-converters at substantially a same time as the reference signal representing the desired output of the power converter decreases. In this manner, greater accuracy, predictability and control may be achieved.

The method can 100 can be implemented in many different ways. In one example embodiment, the method 100 is used in a power converter where each sub-converter is assigned to a position in a sequential queue. In such embodiments, selectively and consistently turning on the power switch of one or more of the sub-converters may include turning on a next sub-converter in the queue having a power switch that is not turned on. Similarly, selectively and consistently turning off the power switch of one or more of the sub-converters may include assigning a sub-converter that has had its power switch turned on for the greatest time to an end of the queue and turning off the power switch of that sub-converter. The method 100 may also include reassigning each sub-converter not at the head of the queue one position closer to a head of the queue and assigning the sub-converter at the head of the queue to a rear of the queue.

The reference signal may be an error signal or any other suitable signal. The reference signal may be a digital reference signal or an analog reference signal.

The method 100 may also include controlling output ripple timing to regulate the output of the power converter.

According to another aspect of the present disclosure, a method 200 of controlling a multiphase power converter including a plurality of sub-converters coupled to provide an output to a load is disclosed. Each sub-converter includes a power switch. The method includes, at 202, comparing a reference signal representing a desired output voltage to a count of a counter associated with one of the plurality of sub-converters to determine whether to generate a control signal for a switch of said sub-converter. At 204, the method also includes incrementing the count when the reference signal changes in a first direction.

In some embodiments, the method 200 may include not incrementing the count when the reference signal changes in a second direction. Additionally, or alternatively, the method 200 may include incrementing the count in response to a periodic clock signal.

The aspects described above, and multiphase power converters operating according to one or more of the aspects described above, may be used in any suitable multiphase power converter application. For example, they may be used with a multiphase power converter for a radio frequency (RF) amplifier, a multiphase power converter for a system with rapidly changing current demands, etc.

One example embodiment of multiphase power converter, 300, implementing the aspects described above will now be described with reference to FIGS. 3, 4 and 5. It should be understood, however, that the teachings of this disclosure are not limited to the particular examples shown, and that one or more of the aspects described above can be implemented in a variety of other multiphase power converters without departing from the scope of this disclosure.

Figure 3:
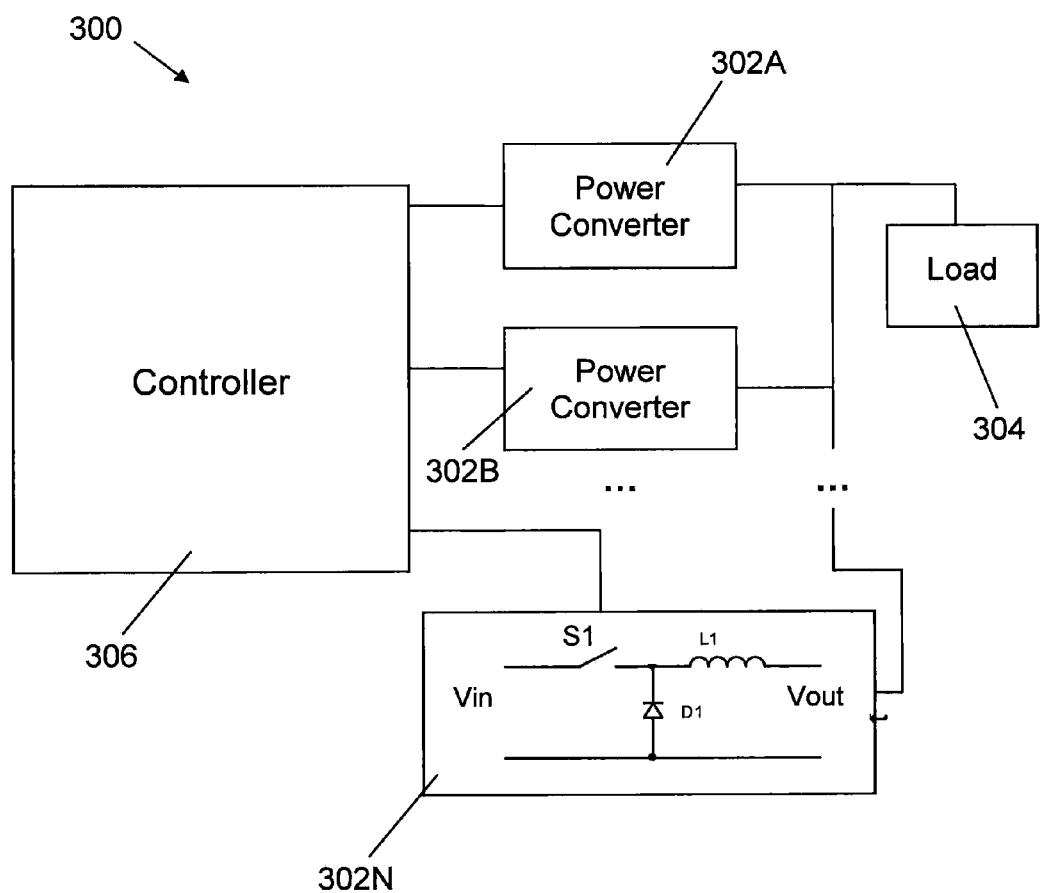
FIG. 3 is a block diagram of a multiphase power converter according to one example embodiment of the present disclosure.

As shown in FIG. 3, the power converter 300 includes a plurality of sub-converters 302A through 302N (generally, the sub-converters 302). Although only three converters 302 are illustrated, the sub-converters 302 may be any appropriate number of sub-converters 302. The "N" in reference number 302N simply indicates that it is the Nth sub-converter of N sub-converters.

Sub-converter 302N illustrates one example sub-converter as a buck converter. However, the sub-converters 302 may be any suitable sub-converter topology.

The converters 302 are coupled in parallel to provide an output to a load 304. Each of the sub-converters 302 includes at least one power switch, such as switch 51 in converter 302N. In this embodiment, a controller 306 selectively and consistently turns on the power switch of one or more of the sub-converters 302 at substantially a same time as a reference signal representing a desired output of the power converter 300 increases. Similarly, the controller 306 selectively and consistently turns off the power switch of one or more of the sub-converters 302 at substantially a same time as the reference signal representing the desired output of the power converter 300 decreases.

When the value of the reference signal changes, whether increasing or decreasing, the controller 306 may need to turn on or off the power switch of one or more of the sub-converters 302. The controller 306 is configured to accomplish this turn on or turn off at substantially the same time that the value of the reference signal changes. There is no random delay between a change in the reference signal and turning a switch of a sub-converter 302 on or off. This allows greater accuracy, predictability and control as compared to some known methods of controlling a multiphase power converter.

Further, this accurate timing permits the controller 306 to better handle current or voltage ripple that occurs when one or more sub-converters 302 are turned on or off. The timing of the occurrence of output ripple can be precisely controlled to improve operation of the converter 300. For example, the controller may adjust the turn on timing of one of the converters 302 to take advantage of the output ripple to support the direction in which the output of the converter 300 is being changed. Similarly, the timing of the switching transitions may be adjusted to offset the ripple caused by another sub-converter, etc.

Figure 4:
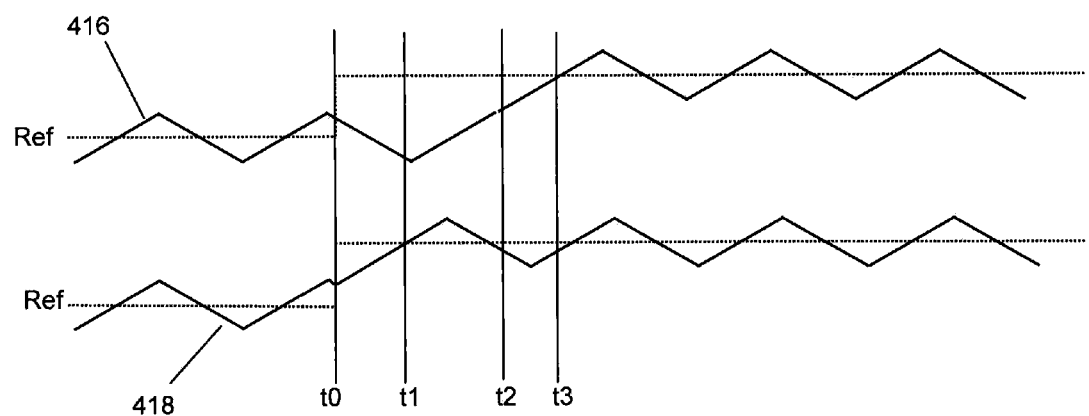
FIG. 4 is a graph of an example output waveform of a prior art multiphase converter and an example output waveform of a multiphase converter according to at least one aspect of this disclosure.

In FIG. 4, an example output waveform 416 of a prior art multiphase converter is compared with an example output waveform 418 of a multiphase converter according to at least one aspect of this disclosure, for example converter 300. At time t0, the reference signal (REF) changes, indicating the converter is signaling for an increase in output voltage 416, 418. The converter 300 begins producing control signals for one or more sub-converters 302 at about the same time t0 as the reference signal REF changes, therefore the output voltage 418 reaches the output commanded by the changed reference REF by time t1. The prior art converter, however, cannot respond as quickly because of a fixed timing (set by a clock signal) for turning on, or off, one or more sub-converters. Accordingly, the prior art converter does not enable an additional sub-converter until about time t2 and does not reach the commanded output voltage until time t3. In addition to the significant time delay in the response of the prior art converter, the delay varies depending on when the reference signal changes. For example, if the reference signal REF changed at t1, instead of t0, the prior art converter output voltage 416 would look the same. For the converter 300, however, if the reference signal changed at t1, the output waveform 418 shown in FIG. 4 would change likewise, because the converter 300 would turn on one or more sub-converters 302 at time t1 (instead of waiting until time t2 as the prior art converter does).

The controller 306 and operation of the power converter 300 will be further described with reference to a portion of the controller 306 illustrated in FIG. 5.

Figure 5:
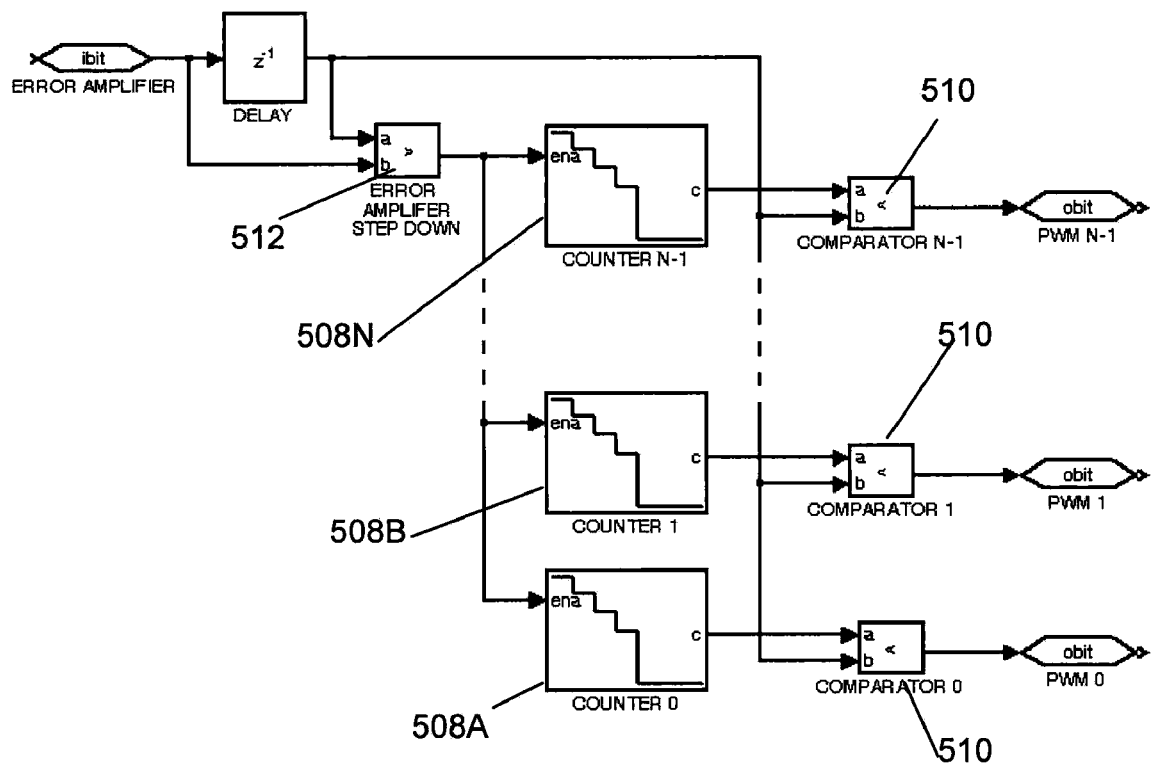
FIG. 5 is a diagram of a portion of the controller for the multiphase power converter of FIG. 3.

As shown in FIG. 5, the controller 306 includes a plurality of counters 508A through 508N (generally, the counters 508). Each of the counters 508 has a controllable state, i.e. a count. The count is typically represented as an integer value. Each counter may be incremented to change (or increment) its count up or down by a certain value (typically one).

Each of the counters 508 is associated with a different one of the converters 302. For example, counter 508A may be associated with converter 302A, counter 508B may be associated with converter 302B and counter 508N may be associated with converter 302N.

At startup, each of the counters 508 is set to an initial count. The initial count of each counter 508 differs from the initial count of each other counter 508. The counters 508 form a queue from lowest to highest count. Each counter 508 may be separated from the next (or previous) counter in the queue by the amount by which the counters 508 increment. Typically, the difference between the counts of each counter 508 will be one and the counters 508 will increment, when so instructed, by one. Accordingly, the counters 508 may have initial counts of zero for counter 508A, one for counter 508B and (N−1) for counter 508N, where N is the number of counters 508. When the counters 508 increment from the initial count, counter 508B will increment down to zero and counter 508N will increment down to (N−2). The counter at the head of the queue, counter 508A in this example, will be moved to the rear of the queue by incrementing to (N−1).

The output, i.e. the count, of each counter 508 is compared to a reference signal. In this example embodiment, the reference signal represents a desired output of the power converter 300. In a digital system, the reference signal may be a digital reference signal. The reference signal may simply be (or represent) the number of converters 302 to be turned on at a particular time. The reference signal can be created according to any suitable technique, including, for example, feedback, feedforward, with frequency compensation, without frequency compensation, with linear methods, with non-linear methods, etc. For each counter 508, if a relationship between the count and the reference signal satisfies a condition, the controller 306 provides a control signal to at least one power switch in the sub-converter 302 associated with that counter 508 to turn on the power switch.

In the particular embodiment of FIG. 5, the comparisons are performed by comparators 510 and the condition is that the count be less than the reference signal. The comparison between the reference signal and the counts may occur substantially continuously. The controller may continuously provide a control signal to turn on/close the power switch of the sub-converters 302 associated with a counter 508 whose count satisfies the condition. Conversely, the controller 306 may continuously not provide a control signal to the power switch of any sub-converters 302 associated with a counter 508 whose count does not satisfy the condition.

In the example embodiment of FIGS. 3 and 5, the current reference signal is also compared with a previous value of the reference signal. If the relationship between the current reference signal and the previous value of the reference signal satisfies a condition, the count of each of the counters 508 is incremented. The conditional relationship between the current and previous value of the reference signal which must be satisfied in this embodiment is the current reference signal being less than the previous value of the reference signal.

In this particular embodiment, the comparison is performed by comparator 512 and incrementing the counters 508 causes the count of each counter 508 to decrease by one. Alternatively, the count of the counters may be increased by one or incremented by some value other than one with corresponding changes to the controller 306 and/or power supply 300. The counter 508 with the lowest count (e.g., counter 508A in the embodiment of FIG. 5) is moved to the end of the queue by resetting its count to (N−1), while counter 508B is incremented from one to zero and 508N is incremented to one. In other embodiments, the counters 508 may increment when the current reference signal is greater than the value of the previous reference signal. By incrementing the counters only when the value of the reference signal changes in one of the two possible directions, the number of switching transitions occurring at one time may be reduced, as will be further explained in the example below.

Figure 6:
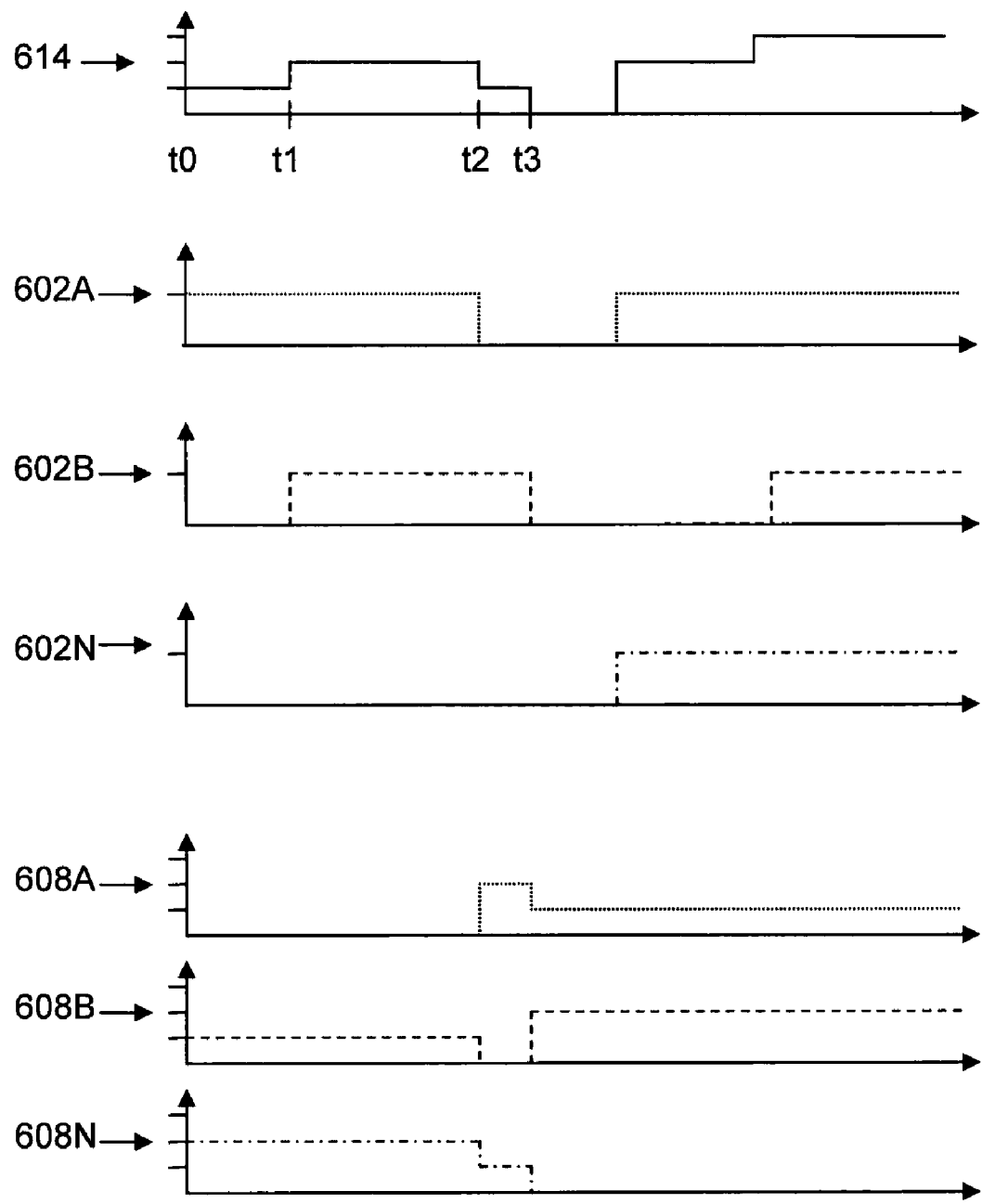
FIG. 6 is a graphical representation of an example reference signal, PWM signals and counter states for the multiphase power converter of FIG. 3.

The operation of the example multiphase power converter shown in FIGS. 3 and 5 will be further explained with reference to FIG. 6. For this example, it will be assumed that the power converter has only three sub-converters 302A, 302B, and 302N. Sub-converters 302A, 302B, 302N are associated with counters 508A, 508B, 508N respectively. FIG. 6 graphically illustrates the reference signal 614, the counts 608A, 608B and 608N of the counters 508A, 508B and 508N (respectively), and the control signals 602A, 602B, 602N provided to the sub-converters 302A, 302B and 302N (respectively).

At time t0, counter 508A has a count of zero, counter 508B has an initial count of one and counter 508N has a count of two. The current reference signal and the previous reference signal both have an assumed initial value of one. Because the current and previous values of the reference signal are the same, the counters 508 do not increment and the counts remain the same. Only counter 508A, with a count of zero, has a count less than the reference signal. Therefore, the controller 306 only is providing a control signal to the switch of sub-converter 302A.

At time t1, the reference signal increases to two. Because the current value of the reference signal (i.e., two) is still not less than the previous value of the reference signal (i.e., one), the counters 508 are still not incremented. However, the count of counter 508B (which is still one) is now less than the reference signal so a control signal is now provided to turn on the power switch of sub-converter 302B. Further, a control signal continues to be provided to the power switch of sub-converter 302A, because the count of counter 508A remains less than the reference signal. Accordingly, a single switching transition has occurred, i.e. switching on the power switch of sub-converter 302B.

The reference signal changes back to a value of one at time t2 indicating, in this example, that only one sub-sub-converter 302 should have its switch on. Now the current value of the reference signal (one) is less than the previous value of the reference signal (two). The required condition has been satisfied so the counters 508 are all incremented. Counter 508A is incremented from the head of the queue, with a count of zero, to the rear of the queue with a count of three, counter 508B is incremented to zero and 508N is incremented to one. After the incrementing, the only counter 508 having a count less than the reference signal value of one is counter 508B. Accordingly, the controller 306 continues to provide the control signal to the power switch of sub-converter 302B and stops providing the control signal to the power switch in sub-converter 302A. Again, only a single switching transition occurred when the switch in sub-converter 302A turned off.

In addition to the low number of switching transitions, the operation described above rotates the sub-converters. The sub-converter that has been on the longest (i.e. the one at the head of the queue) is the first to turn off when a sub-converter is to be turned off.

As can be seen from the example above, the control signals for the sub-converters 302 may be generated without any fixed frequency. The control signals are asserted, remain asserted, or are deasserted according to when the reference signal changes and not according to a predetermined fixed frequency. The switching frequency of the power converter 300 and the sub-converters 302 varies and may be distributed over a substantial bandwidth. The varying frequency is not, however, varying at any predetermined rate. The frequency may jump to different frequencies without necessarily having any relationship to a prior frequency. This distribution of the switching frequency may result in switching frequency noise and ripple being spread across the operating bandwidth, reducing noise spectral density.

If the embodiment of FIGS. 3 and 5 are used in an application to provide a fixed (or relatively slowly changing) voltage and/or current output, changes to the operation may be needed to prevent the power switches of the sub-converters 302 from remaining on too long, which may saturate an inductor in the sub-converter, etc. In one embodiment, the counters 508 are also incremented according to a periodic clock signal. This clock signal may be a fixed or variable frequency signal. If the power sub-converter 300 is operating in a steady state (i.e., with constant output voltage and current), the clock signal may be the only event incrementing the counters 508. When a change in output is needed, however, the reference signal changes and, if the change satisfies a condition (as discussed above), the counters 508 are incremented nearly instantaneously because of the changing value of the reference signal and without regard to the clock signal. Such an embodiment may be especially useful in applications that may operate in a steady state for significant periods of time, but which occasionally require changes in output power faster than the clock signal.

Power converters incorporating one or more of the aspects described above may be especially useful in, for example, applications in which output requirements change very rapidly. In particular, such power converters may be useful in applications in which the power converter output may need to be changed at frequencies much higher than the typical switching frequencies of the sub-converters that make up the power converter.

Controllers for multiphase power converters according to this disclosure may be analog controllers and/or digital controllers. The controllers can include one or more discrete components, one or more integrated circuits, microcontrollers, digital signal processors, etc. Further, the methods and embodiments disclosed herein may be implemented via hardware and/or software. For example, the counters discussed above may be operations performed by software in a microprocessor.

The sub-converters used in multiphase power converters according to this disclosure above may be any suitable power converter. For example, the sub-converters may be isolated converters or non-isolated converters. The converters may be buck converters, forward converters, converters derived from buck converters, converters derived from forward converters, etc.

In one example embodiment, a multiphase power converter including one or more aspects described above is designed for delivering power to an RF power amplifier. The example converter includes sixteen sub-converters and a digital controller.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A method of controlling a multiphase power converter including a plurality of sub-converters and a control circuit including a plurality of counters, each counter having a controllable count state different from the other counters, and each counter associated with a different one of the plurality of sub-converters, each controllable count state including a count represented by an integer, the method comprising:
   generating a reference signal representing a desired output of the power converter;
   determining if a relationship between the reference signal and a prior value of the reference signal satisfies a first condition;
   similarly changing the controllable count state of each of the plurality of counters if the first condition is satisfied;
   comparing the reference signal to a current state of each of the plurality of counters to determine for each counter whether a second condition is met; and
   for the sub-converters associated with the counters for which the second condition is met, generating a power switch control signal.

2. The method of claim 1 wherein generating the power switch control signal includes continuing to generate the power switch control signal for any sub-converter that is currently receiving a power switch control signal and is associated with a counter satisfying the second condition and beginning to generate a power switch control signal for any sub-converter not currently receiving a power switch control signal and which is associated with a counter satisfying the second condition.

3. The method of claim 2 further comprising stopping generating a power switch control signal for any sub-converter currently receiving a power switch control signal and associated with a counter for which the second condition is not met.

4. The method of claim 3 wherein comparing includes determining, for each counter, if the count is less than the reference signal.

5. The method of claim 4 wherein determining includes determining if the reference signal is less than the prior value of the reference signal.

6. The method of claim 5 wherein similarly changing the controllable count state of each of the plurality of counters includes decreasing the count of all counters having a non-zero count by a same integer amount and increasing the count of a counter with a zero count to the same integer amount above the greatest non-zero count.

7. The method of claim 1 wherein generating the power switch control signal includes generating the power switch control signal at a varying frequency.

8. The method of claim 1 wherein comparing the reference signal to the current state of each of the plurality of counters includes comparing the reference signal to the current state of each of the plurality of counters substantially continuously.

9. A method of controlling a multiphase power converter including a plurality of sub-converters coupled to provide an actual output of the power converter to a load in response to a reference signal representing a desired output of the power converter, each sub-converter including a power switch, the method comprising:
selectively and consistently turning on the power switch of one or more of the sub-converters, to provide the actual output of the power converter to the load, at substantially a same time as the reference signal representing the desired output of the power converter increases; and
selectively and consistently turning off the power switch of one or more of the sub-converters at substantially a same time as the reference signal representing the desired output of the power converter decreases.

10. The method of claim 9 further comprising controlling output ripple timing to regulate the output.

11. The method of claim 9 wherein each sub-converter is assigned to a position in a sequential queue and wherein selectively and consistently turning on the power switch of one or more of the sub-converters includes turning on a next sub-converter in the queue having a power switch that is not turned on.

12. The method of claim 9 wherein each sub-converter is assigned to a position in a sequential queue and wherein selectively and consistently turning off the power switch of one or more of the sub-converters includes assigning a sub-converter that has had its power switch turned on for the greatest time to an end of the queue and turning off the power switch of such sub-converter.

13. The method of claim 9 wherein each sub-converter is assigned to a position in a sequential queue including a head and a rear, the method further comprising reassigning each sub-converter not at the head of the queue one position closer to the head of the queue and assigning the sub-converter at the head of the queue to the rear of the queue.

14. The method of claim 9 wherein the reference signal is an error signal.

15. The method of claim 14 wherein the reference signal is a digital reference signal.

16. A controller for a multiphase power converter, the controller configured to perform the method of claim 9.

17. The controller of claim 16 further comprising an error amplifier to provide the reference signal.

18. A multiphase power converter comprising the controller of claim 16 and a plurality of sub-converters coupled to provide power to a load.

19. A method of controlling a multiphase power converter including a plurality of sub-converters coupled to provide an actual output voltage of the power converter to a load in response to a reference signal representing a desired output voltage of the power converter, each sub-converter including a power switch, the method comprising:
coupling the actual output voltage of the power converter to the load;
comparing the reference signal representing the desired output voltage of the power converter to a count of a counter associated with one of the plurality of sub-converters to determine whether to generate a control signal for a switch of said sub-converter; and
incrementing the count when the reference signal changes in a first direction.

20. The method of claim 19 further comprising not incrementing the count when the reference signal changes in a second direction.

21. The method of claim 19 further comprising incrementing the count in response to a periodic clock signal.

22. A multiphase power converter including a plurality of sub-converters coupled to provide power to a load and a controller configured to perform the method of claim 19.

23. The method of claim 21 wherein the periodic clock signal includes a variable frequency signal.

* * * * *

UNITED STATES PATENT AND TRADEMARK OFFICE
CERTIFICATE OF CORRECTION

| | | |
|---|---|---|
| PATENT NO. | : 8,400,125 B2 | Page 1 of 1 |
| APPLICATION NO. | : 12/566892 | |
| DATED | : March 19, 2013 | |
| INVENTOR(S) | : Markowski | |

It is certified that error appears in the above-identified patent and that said Letters Patent is hereby corrected as shown below:

On the Title Page, at item (54) and in the Specification, column 1, replace "Multiphase Power Converters, Controllers And Control Methods", with "Multiphase Power Converters, Controllers And Control Methods For Power Switches".

In the Specification

At column 4, line 40, replace "51" with "S1".

Signed and Sealed this
Seventeenth Day of February, 2015

Michelle K. Lee
*Deputy Director of the United States Patent and Trademark Office*